G. S. GRIER.
Improvement in Harvester-Reels.
No. 128,616.                              Patented July 2, 1872.
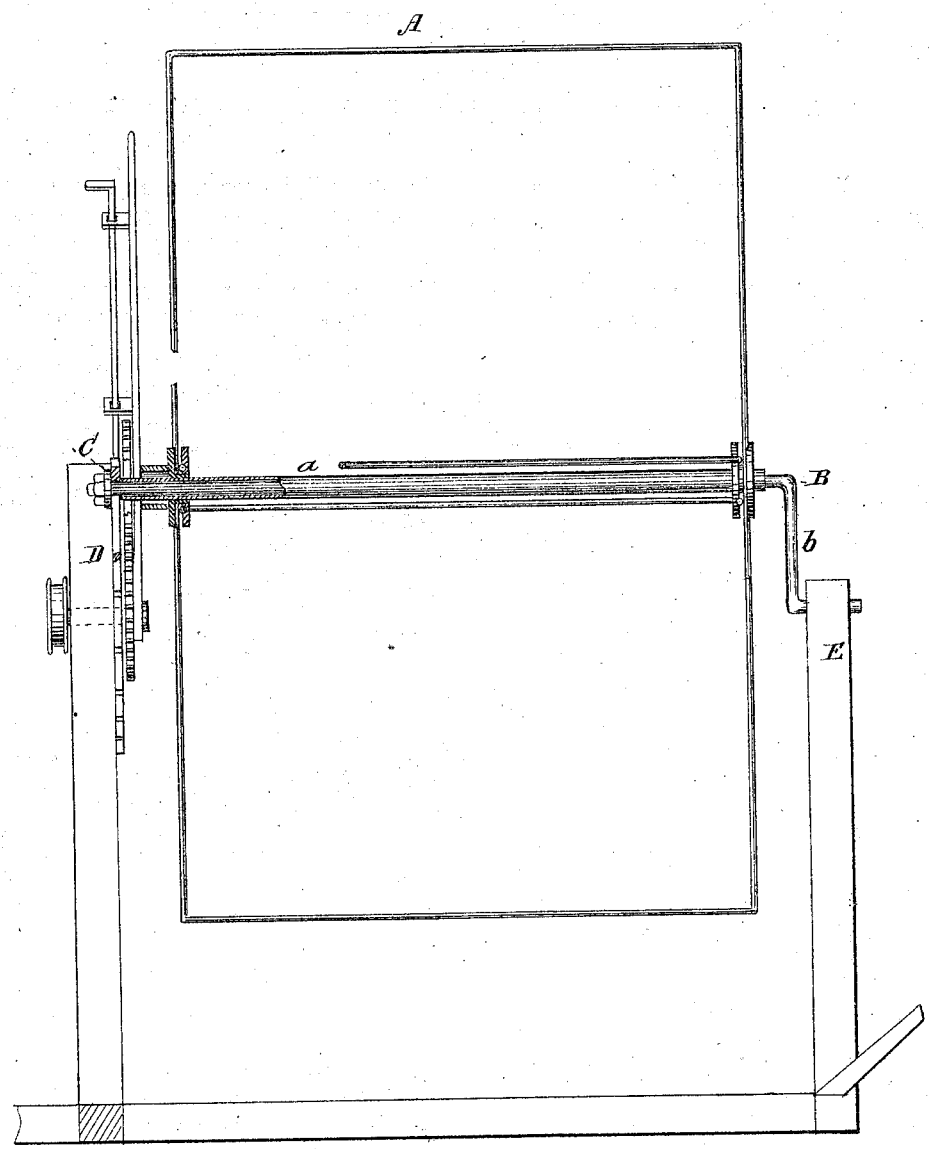

128,616

UNITED STATES PATENT OFFICE.

GEORGE S. GRIER, OF MILFORD, DELAWARE.

IMPROVEMENT IN HARVESTER-REELS.

Specification forming part of Letters Patent No. 128,616, dated July 2, 1872.

Specification describing Improvements in Harvester-Reels, invented by GEORGE S. GRIER, of Milford, in the county of Kent and State of Delaware.

The invention consists in supporting an adjustable reel by means of a pivoted crank-shaft, which passes through the hollow shaft of said reel and moves up or down with it.

In the drawing the figure is a front view, partly in sections.

A represents the reel of a harvester, having the hollow shaft $a$, which receives and turns on the shaft B. The shaft B is made fast at one end, in a bearing, C, that is adjustable in the arc-slotted plate D, while the other end $b$ is crank-shaped and pivoted in an arm, E.

Thus it will be perceived that a firm support is afforded to the reel at all times, while it is still allowed a quick and easy adjustment.

Having thus described my invention, what I claim as new, and desire to secure by Letters Patent, is—

The combination, with hollow reel shaft $a$, of an internal shaft, B, having one end made fast in movable bearing C and the other cranked and pivoted in arm E, as and for the purpose described.

GEORGE S. GRIER.

Witnesses:
R. H. PHELPS,
G. P. MINORS.